(12) United States Patent
Huang et al.

(10) Patent No.: US 7,239,429 B2
(45) Date of Patent: Jul. 3, 2007

(54) METHOD AND APPARATUS FOR GENERATING DISPERSED CLUSTER SCREEN

(75) Inventors: Jincheng Huang, Sunnyvale, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 942 days.

(21) Appl. No.: 10/447,849

(22) Filed: May 29, 2003

(65) Prior Publication Data

US 2004/0252346 A1    Dec. 16, 2004

(51) Int. Cl.
*H04N 1/405* (2006.01)
*H04N 1/407* (2006.01)
*H04N 1/409* (2006.01)

(52) U.S. Cl. .................. 358/3.06; 358/3.09; 358/3.12; 358/3.17; 358/3.18; 358/3.2; 358/3.26

(58) Field of Classification Search ...... 358/3.12–3.14, 358/3.16–3.18, 3.2–3.21, 3.06, 3.26, 1.9, 358/533–536; 382/270; 345/596, 599
See application file for complete search history.

(56) References Cited

U.S. PATENT DOCUMENTS

| | | | | |
|---|---|---|---|---|
| 5,592,592 A | * | 1/1997 | Shu | 358/1.9 |
| 5,625,755 A | * | 4/1997 | Shu | 358/1.9 |
| 5,684,932 A | * | 11/1997 | Shu | 358/1.9 |
| 5,696,602 A | | 12/1997 | Cooper et al. | |
| 5,784,049 A | | 7/1998 | Hall | |
| 5,787,238 A | | 7/1998 | Wang | |
| 5,859,955 A | | 1/1999 | Wang | 358/3.19 |
| 5,892,588 A | | 4/1999 | Samworth | |
| 5,912,745 A | | 6/1999 | Ulichney | 358/3.13 |
| 5,973,803 A | | 10/1999 | Cheung et al. | |
| 5,978,556 A | | 11/1999 | Wang | |
| 6,088,512 A | | 7/2000 | Ancin et al. | 358/3.17 |
| 6,118,935 A | | 9/2000 | Samworth | |
| 6,172,773 B1 | | 1/2001 | Ulichney | 358/3.13 |
| 6,363,172 B1 | | 3/2002 | Cheung et al. | |
| 6,710,778 B2 | * | 3/2004 | Cooper | 358/3.17 |
| 6,724,501 B2 | * | 4/2004 | Atkins et al. | 358/3.17 |
| 6,873,338 B2 | * | 3/2005 | Berstis | 345/596 |

* cited by examiner

*Primary Examiner*—Scott A. Rogers

(57) ABSTRACT

A method for generating a dispersed cluster screen defining a stable environment for printing an image is provided. The method initiates with generating a pattern of cluster centroids. Then a cluster growth sequence is defined. Next, a cluster is grown around the cluster centroid according to the cluster growth sequence. A computer readable medium having program instructions for generating a dispersed cluster screen and an image forming device configured to print an image according to a dispersed cluster screen technique are also provided.

23 Claims, 10 Drawing Sheets

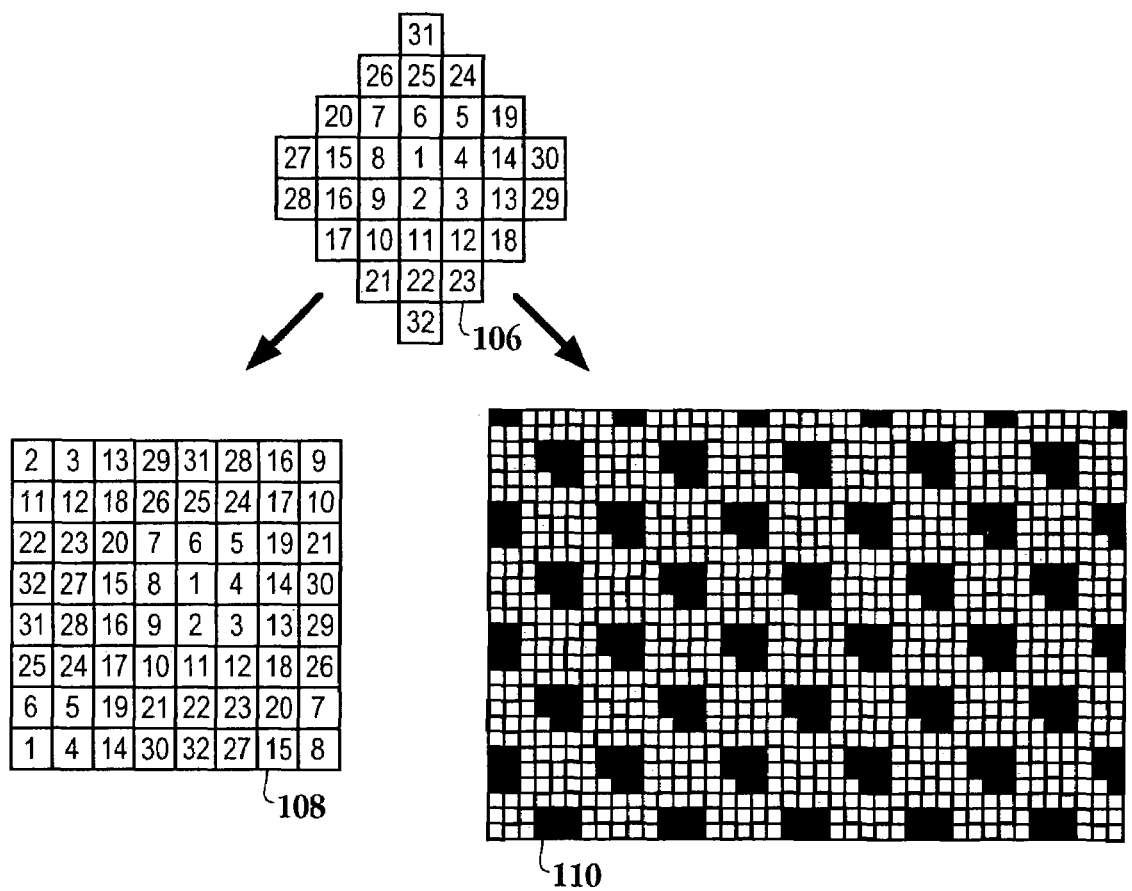
Fig. 1B *(prior art)*

METHOD AND APPARATUS FOR GENERATING DISPERSED CLUSTER SCREEN

BACKGROUND OF THE INVENTION

1. Field of the Invention

This invention relates generally to rendering systems and more particularly to a method and apparatus for generating a dispersed cluster screen that produces stable light-tones and minimizes visual repeated patterns.

2. Description of the Related Art

Printers are now a commonplace item in the home as well as the office environment. Through the process of halftoning, a bi-level device, e.g., a laser printer, transforms an image with greater amplitude resolution to an image with lesser amplitude resolution. The basic premise is to trade off resolution for greater apparent tone depth. Digital halftoning techniques may be classified as frequency modulation (FM) screening or amplitude modulation (AM) screening. FM screening, also known as stochastic screening, uses algorithms that place dots in neither completely regular nor completely random fashion. One of the biggest advantages of FM screening is that it eliminates moiré patterns that can form in halftones. AM dot patterns, e.g., clustered dot screen and dispersed dot screen, are ordered schemes as they share a common grid or cell structure. An AM dot pattern breaks up an image into dots of varying sizes to simulate the original image. FM screening, on the other hand, keeps the dots the same size and varies the frequency, or number, of dots and the location of those dots to simulate the original image.

The printing mechanism for a laser printer tends to be unstable when printing a single dot. Dispersed dot screen techniques require stable formation of an isolated single dot; therefore, such techniques are more suitable for display screens and not for a laser printer. FIG. 1A illustrates a dispersed dot screen. Block 102 is the original basic halftone array. Base image unit 100 is an 8×8 block that repeats, i.e., an equivalent halftone block. As can be seen in block 104, isolated single dots occur, thereby causing instability in printing device such as a laser printer. Also, the regular structure of the screen can be seen.

Clustered dot screen techniques cluster dots together for a stronger signal. However, the structures of clustered dot screens tend to be visible due to the periodicity. Furthermore, moiré patterns tend to appear with the application of clustered dot screens for color printing as two or more periodic structures are superimposed. FIG. 1B illustrates a clustered dot screen. Block 106 is the original basic halftone array. Block 108 is its rectangular equivalent block. As can be seen in block 110, the structure of the clustered dots is readily visible.

FIG. 1C represents a stochastic screening model, i.e., an FM technique. A shortcoming of the FM technique with bi level devices, such as a laser printer, is that for light tone regions and mid tone regions single isolated dots may be required to be printed, as illustrated in block 112. Thus, the laser printing mechanism becomes unstable for the light and mid tone regions and does not satisfactorily reproduce the small halftone dots associated with the stochastic screening model.

As a result, there is a need to solve the problems of the prior art to provide a technique that substantially eliminates any visible patterns and is stable for light and mid tone regions when printing an image.

SUMMARY OF THE INVENTION

Broadly speaking, the present invention fills these needs by defining a scheme that generates clusters of dots and distributes those clusters in a homogenous manner. The distributed dots are then grown in a manner that precludes the creation of an unstable situation. It should be appreciated that the present invention can be implemented in numerous ways, including as a process, a system, or a device. Several inventive embodiments of the present invention are described below.

In one embodiment, a method for preparing image data for printing is provided. The method initiates with generating a pattern of centroids. Then, each of the centroids are grown to at least a first threshold size cluster. Next, it is determined whether a void sufficient for placing a new cluster exists. It should be appreciated that as used herein a void is defined as empty space between dots and cluster is a group of dots. If a void sufficient for placing a new cluster exists, then the method includes filling the void with a new centroid and growing the new centroid to at least a second threshold size cluster. Next, a largest remaining void is identified. Then, a dot is placed alongside a cluster in a manner to reduce a size of the largest remaining void.

In another embodiment, a method for generating a dispersed cluster screen defining a stable environment for printing an image is provided. The method initiates with generating a pattern of cluster centroids. Then a cluster growth sequence is defined. Next, a cluster is grown around each cluster centroid according to the cluster growth sequence. A largest remaining void is identified, and a dot is placed alongside an existing cluster proximate to the largest remaining void in a manner to reduce a size of the largest remaining void.

In yet another embodiment, a computer readable medium having program instructions for generating a dispersed cluster screen is provided. The computer readable medium includes program instructions for generating a cluster centroid. Program instructions for defining a cluster growth sequence are also provided. Program instructions for growing a cluster around each cluster centroid according to the cluster growth sequence are included. Program instructions for identifying a largest remaining void, and for placing a dot alongside an existing cluster proximate to the largest remaining void in a manner to reduce a size of the largest remaining void are also provided.

In still yet another embodiment, an image forming apparatus is provided. The image forming apparatus includes an input/output (I/O) port configured to communicate with and external device. A memory configured to store image data is included. A processor configured to execute instructions for printing the image data is included. Dispersed cluster screen circuitry is also provided. The dispersed cluster screen circuitry is configured to enable printing of the image data through the generation of homogenously distributed clusters of dots. Each of the clusters of dots is grown from a centroid, wherein a size of each of the clusters of dots is stable for the printing structure of the image forming apparatus. Also included is a bus enabling communication between the I/O port, the memory, the dispersed cluster screen circuitry, and the processor.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1B illustrates an exemplary clustered dot screen.

DETAILED DESCRIPTION OF THE PREFERRED EMBODIMENTS

Figure 1A:
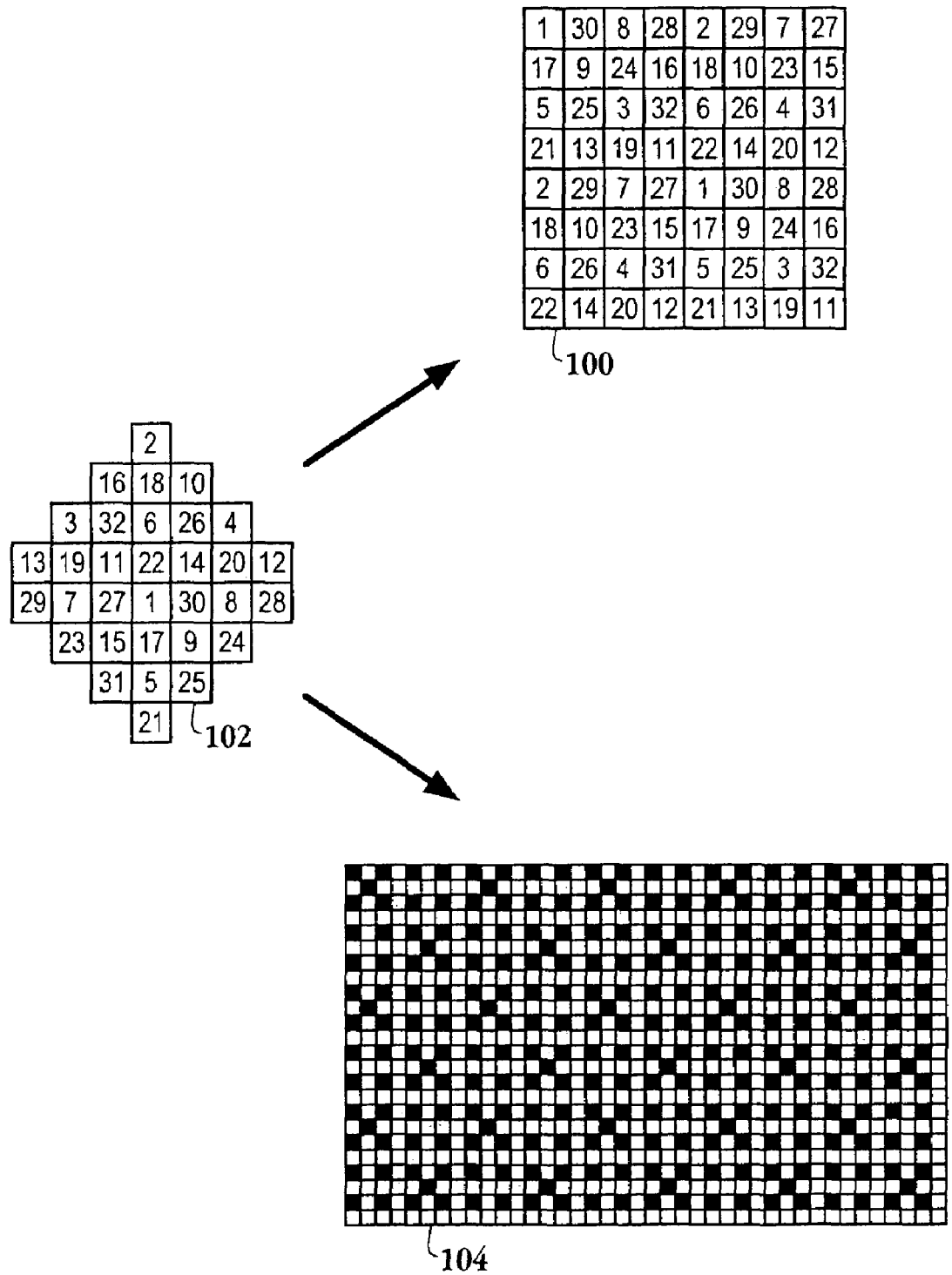
FIG. 1A illustrates an exemplary dispersed dot screen.
Figure 1C:
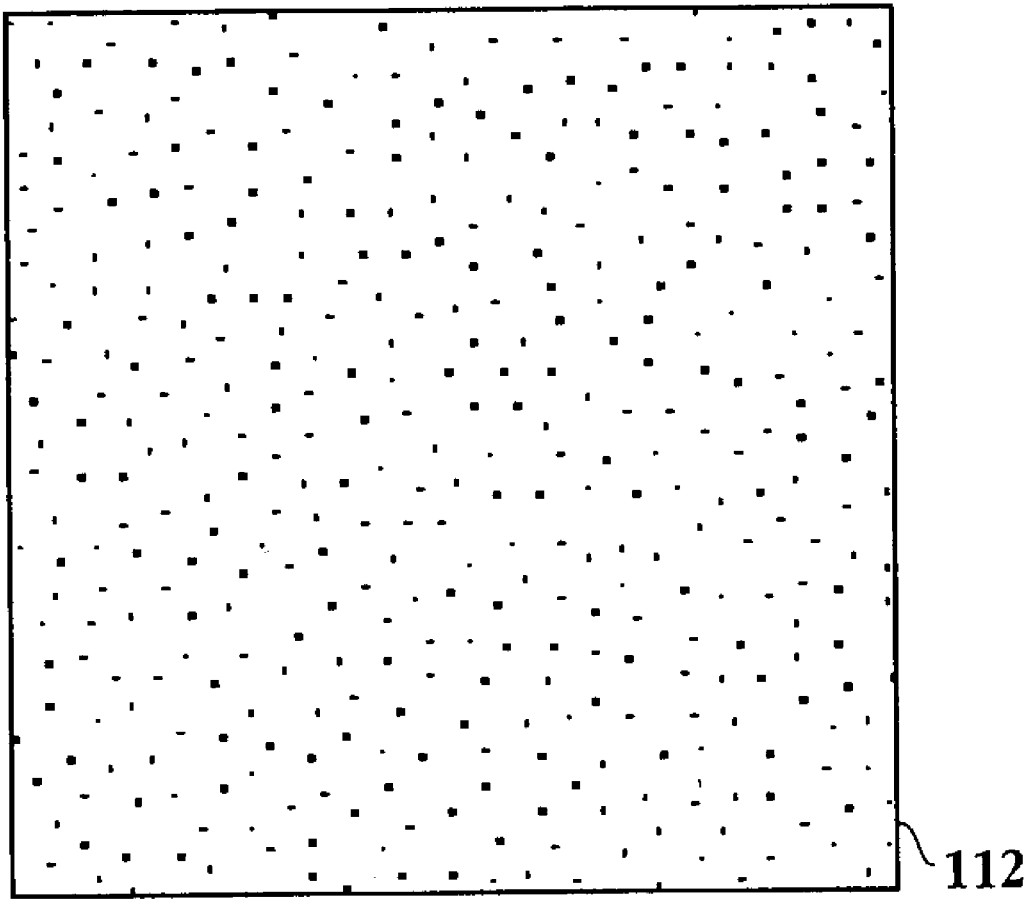
FIG. 1C represents an exemplary stochastic screening model, i.e., FM technique.

An invention is described for an apparatus and method for providing a stable output while minimizing moiré patterns and visible structures when printing images from a printing device. It will be obvious, however, to one skilled in the art, that the present invention may be practiced without some or all of these specific details. In other instances, well known process operations have not been described in detail in order not to unnecessarily obscure the present invention. FIGS. 1A-1C are described in the "Background of the Invention" section. The term about as used herein refers to +/− 10% of the referenced value.

The embodiments of the present invention provide an apparatus and method for generating a dispersed cluster screen to be used when printing a digital image. The image data is translated into a plurality of dots, also referred to as centroids, that are distributed in a homogenous fashion. Thus, the visible structure patterns prevalent with cluster dot screens is minimized. Each of the dots is expanded through a cluster growth sequence. The expansion of each of the dots continues until each cluster formed through the cluster growth sequence is equal to a threshold size.

In one embodiment, the threshold size corresponds to a size after which the cluster of dots becomes too visible or objectionable. Once the plurality of dots are grown to the threshold size, voids, i.e., empty spaces, capable of fitting additional clusters are identified and filled with a dot that is grown into a cluster. Of course, the tone of the print image, i.e., the lightness, darkness, shade of gray and such, at certain regions determines the density of the clusters. In one embodiment, a dot may be appended to any of the clusters in order to further fill a space or void. It should be appreciated that the dot shares a border with one of the clusters so that the printing mechanism is not required to print a single dot which causes an unstable situation for the printing configuration of laser printers.

Figure 2:
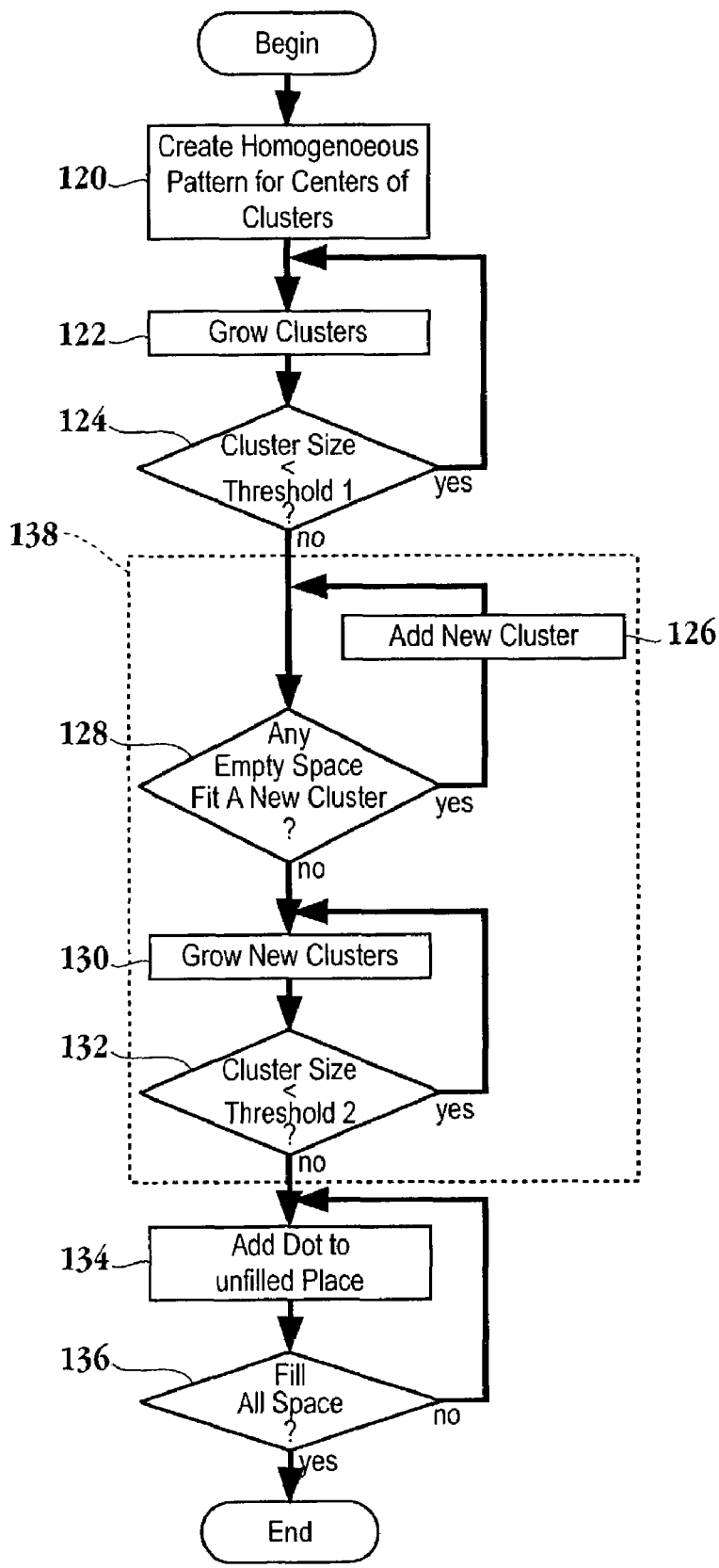
FIG. 2 is a flow chart diagram illustrating the method operations for generating a dispersed-cluster screened for printing image data in accordance with one embodiment of the invention.

FIG. 2 is a flow chart diagram illustrating the method operations for generating a dispersed-cluster screened for printing image data in accordance with one embodiment of the invention. The method initiates with operation 120 where the homogenous pattern for the cluster centroids is generated. It will be apparent to one skilled in the art that the homogenous pattern may be generated by numerous known algorithms, e.g., blue-noise mask or stochastic screen algorithm, such as void-and-cluster, direct binary search, linear programming, neural network, etc. Furthermore, blue-noise screen algorithms tend to create visually pleasing patterns because the dots are placed with an average separation, i.e., neither completely random, nor completely regular, but some combination of randomness and regularity. The method then advances to operation 122 where clusters of dots are grown around the cluster centroids defined by operation 120. In one embodiment, each of the cluster centroids defined in operation 120 are grown simultaneously in operation 122. As will be described in more detail below with reference to FIGS. 5A and 5B, numerous cluster growth patterns may be utilized in operation 122.

The method of FIG. 2 then proceeds to decision operation 124 where it is determined if each cluster has grown to a size that exceeds a threshold size or value. If the cluster size does not exceed the threshold size, the method returns to operation 122 where the cluster continues to grow according to the growth sequence. If the cluster size is equal to or exceeds the threshold value, then the method moves to decision operation 128. It should be appreciated that the threshold size may correspond to a size that is not too visible when printed. Additionally, a size that slightly excess the threshold size is acceptable here as long as the size does not produce a visible pattern when printed. Accordingly, different printing devices may be associated with different threshold sizes. It will be apparent to one skilled in the art that a calculated value corresponding to the size of the cluster may be compared with a stored value associated with the size of a cluster for the printing device to determine whether the grown cluster is of sufficient size.

Still referring to FIG. 2, in order to increase the spatial frequency, new clusters may be added. In decision operation 128 it is determined if any empty space is available to fit a new cluster. If there is empty space available to fit a new cluster in decision operation 128, then a new cluster is added in operation 126. Once all of the space available to fit a new cluster has been identified and a new cluster has been added to that space, the method proceeds to operation 130 where the new clusters are grown. Here, as in operation 122, the clusters may be grown by numerous cluster growth sequences described in more detail with reference to FIGS. 5A and 5B. It should be appreciated that Equation 1 may be used to determine the location of the largest void. As mentioned above, operation 128 also determines if the empty space or void is sufficient for a cluster of a certain size, i.e., a size at least as large as the threshold size. The method then moves to decision operation 132 where it is determined if the new clusters have reached a threshold size. It should be appreciated that the threshold size in decision operation 132 may be the same or different than the threshold size in decision operation 124. If the cluster size is not equal to or greater than the threshold size in decision operation 132, then the method returns to operation 130 where the clusters continue to grow according to the growth sequence.

If the cluster size is equal to or greater than the threshold value in decision operation 132, then the method proceeds to operation 134 where a dot, i.e., centroid, is added to an unfilled place. That is, the largest empty space, i.e., void, is located and a dot is added. It should be appreciated that the dot will share a border with one of the clusters so that a bi-level printing device will not have to print a single dot, thereby eliminating a potentially unstable, situation. In one embodiment, the cost values from Equation 1 may be used to determine the location of a minimum value associated with a largest void. Accordingly, the dot is added so that the dot shares a border with a cluster wherein a section of the perimeter of the cluster is proximate to the void. Therefore, the dot is added along this section of the perimeter of the cluster in order to fill part of the void.

Figure 3:
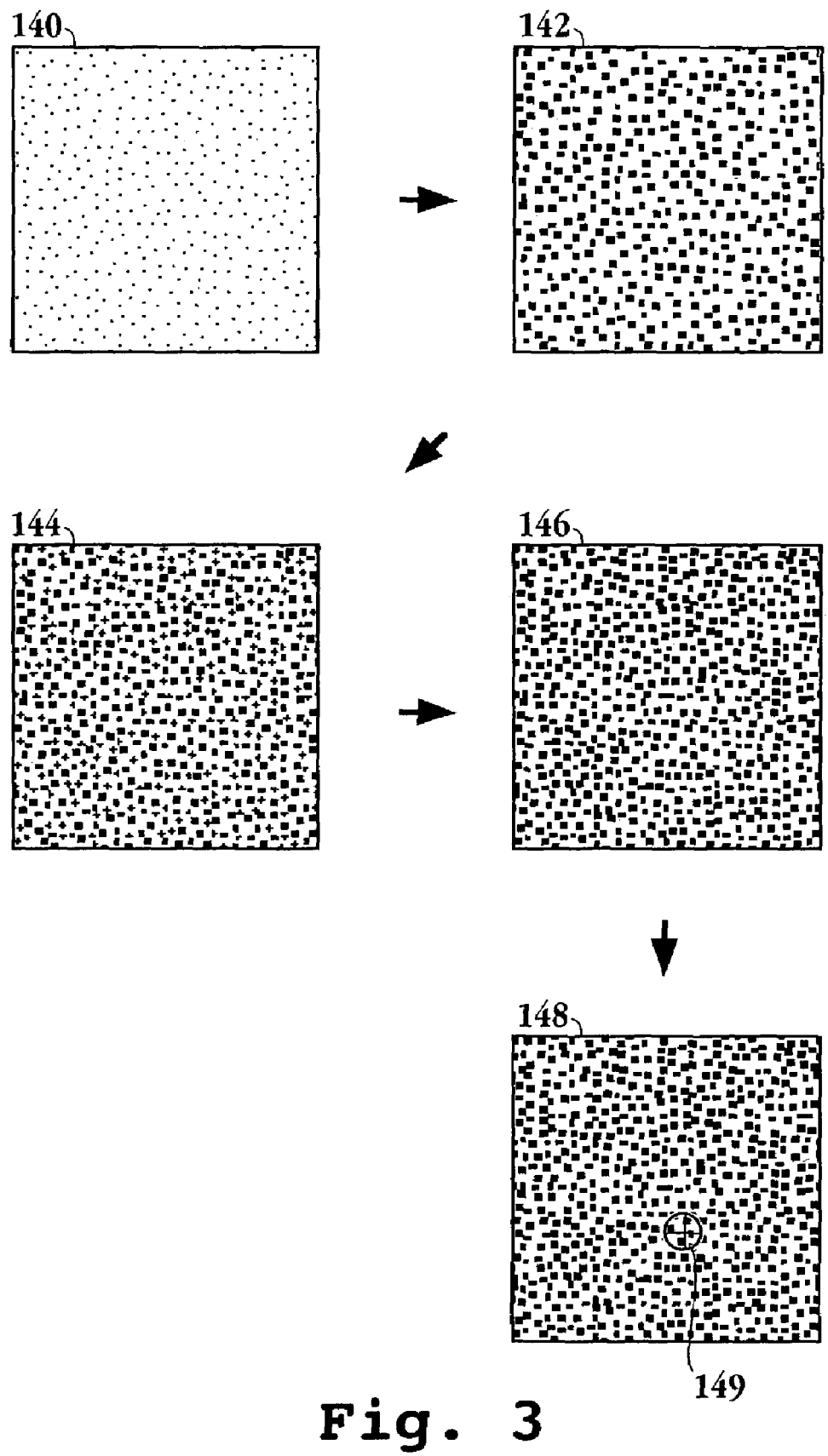
FIG. 3 is a schematic diagram illustrating blocks corresponding to the results of certain method operations of FIG. 2.

FIG. 3 is a schematic diagram illustrating blocks corresponding to the results of certain method operations of FIG. 2. Block 140 illustrates a pattern generated by a void-and-cluster optimization. The fundamental principle of the void-and-cluster algorithm is to avoid large clusters and large voids. As used herein, a void is a space between dots or clusters and a cluster is a group of dots. Disclosed herein is an optimization of the void-and-cluster algorithm where the optimization is performed in the spatial domain by searching for the largest cluster and the largest void. To achieve the goal of producing a homogenous distribution of dots as illustrated in FIG. 3, dots are removed from the tightest clusters and added to the largest void. To determine the location of the largest void and cluster, a filter function for convolution with the dot pattern may be used. Locations of the minimum and maximum values of the filtered pattern define the largest void and largest cluster, respectively. The spatial cost function is defined as follows:

$$P_f = \sum_{p=-N_x/2}^{N_x/2} \sum_{q=-N_y/2}^{N_y/2} P(x', y') f(p, q) \quad (1)$$

$$x' = (x + N_x - p) \mod N_x$$

$$y' = (y + N_y - q) \mod N_y$$

Figure 5A:
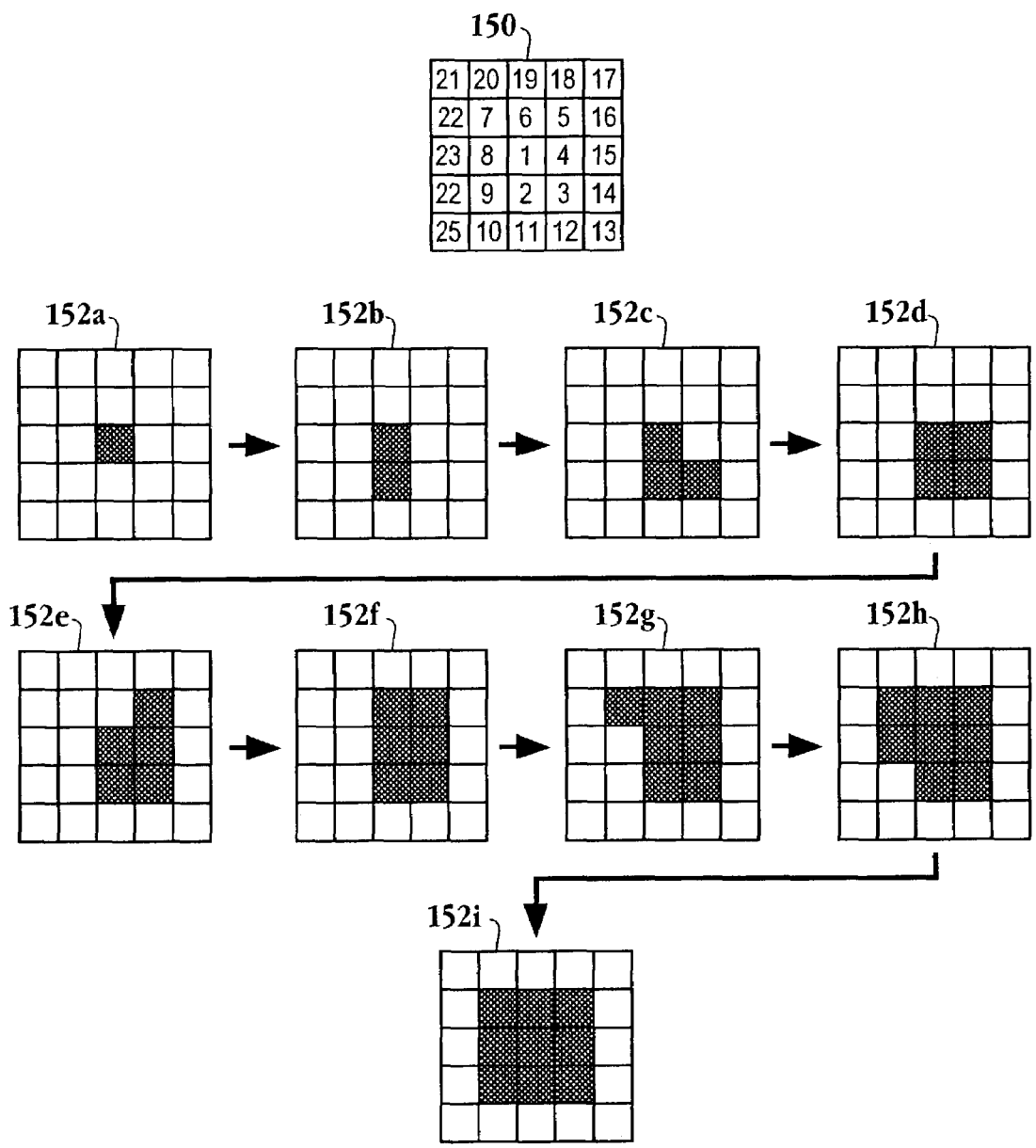
FIG. 5A illustrates a cluster growth sequence for a 3×3 cluster according to the pattern of block 150.
Figure 5B:
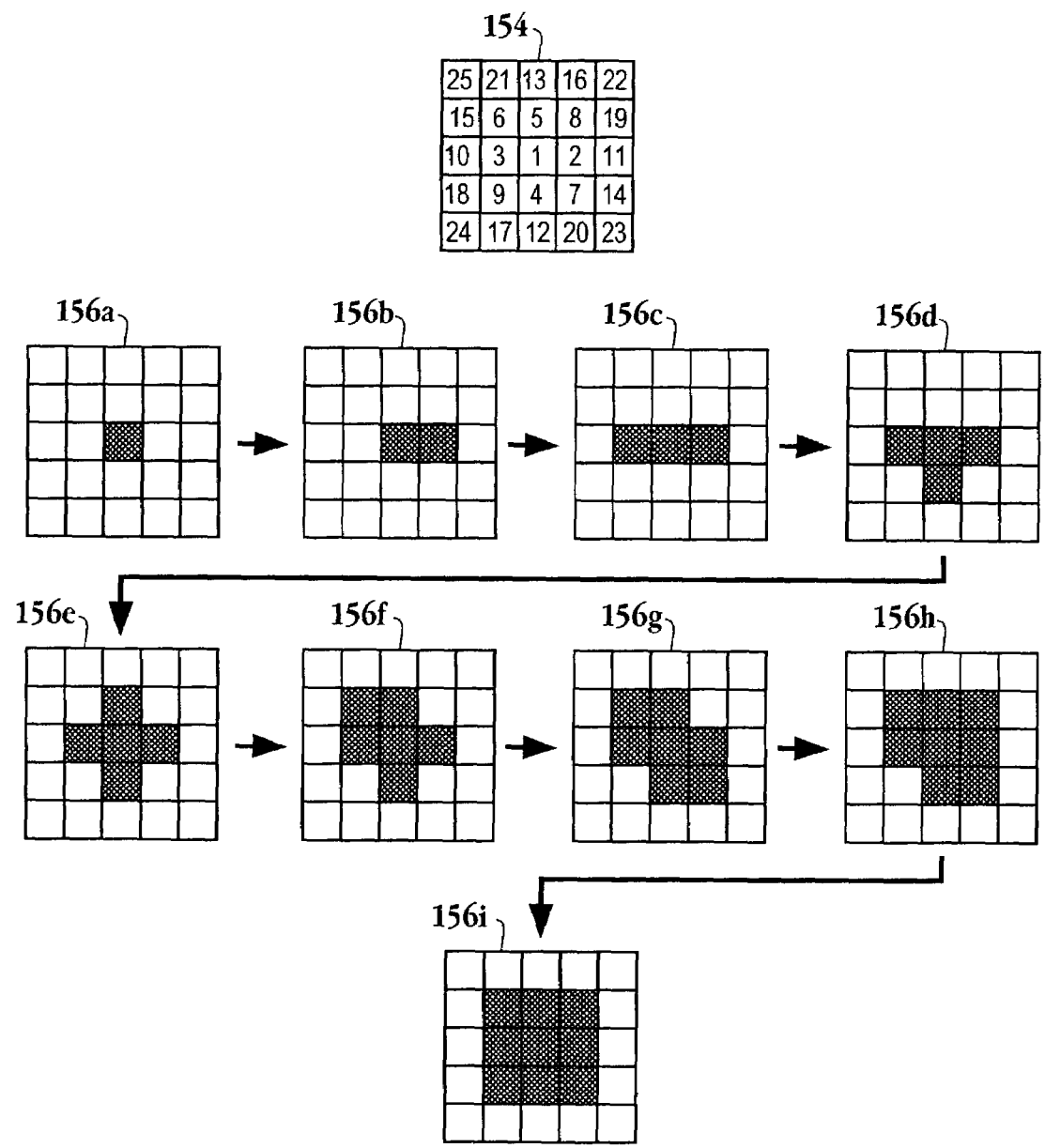
FIG. 5B illustrates an alternative cluster growth sequence for a 3×3 cluster according to the pattern of block 154.

Here, the size of the pattern of FIG. 3 is X=128 and Y=128 and the pattern is generated by the void-and-cluster optimization described just above. The filter is a Gaussian filter, which is $f(x, y) = e^{-(x^2+y^2)/(2*\sigma^2)}$. The number of dots in block 140, i.e., the number of cluster centroids, is equal to 400. It should be appreciated that block 140 corresponds to the output method operation 120 where a homogenous pattern of cluster centroids is defined. Once the pattern of cluster centroids is generated, the clusters grow around the centroids. Referring to FIGS. 5A and 5B, exemplary illustrations of cluster growth sequences are provided in accordance with one embodiment of the invention. FIG. 5A illustrates a cluster growth sequence for a 3×3 cluster according to the pattern of block 150. Blocks 152a-152i illustrate the progression of the stepwise addition of dots, which are represented by the squares of each block, to grow the cluster. FIG. 5B illustrates an alternative cluster growth sequence for a 3×3 cluster according to the pattern of block 154. Blocks 156a-156i illustrate the progression of the stepwise addition of dots to grow the cluster. It should be appreciated that the two cluster growth sequences shown with reference to FIGS. 5A and 5B are exemplary and not meant to be limiting, as any number of cluster growth sequences are available depending on the characteristics of the printer. Furthermore, while FIGS. 5A and 5B illustrate an exemplary cluster growing to a 3×3 block, it should be further appreciated that the clusters can stop growing at any point where it is determined that the cluster size becomes too visible or objectionable for the corresponding printer, which may be more or less than a 3×3 block. Additionally, the cluster growth sequence may terminate prior to a full block is defined.

Returning to FIG. 3, the output of the grown clusters is illustrated in block 142, which corresponds to method operations 122 and 124 of FIG. 2. As can be seen, there is no discernible pattern for the clusters of block 142. Block 144 demonstrates the output of the search for new cluster centroids which corresponds to operations 126 and 128 of FIG. 2. It should be appreciated that Equation 1 may be used to determine the largest void. That is, the location of the minimum value of the filtered pattern identifies the largest void. In block 144 the location of areas that may fit additional centroids is illustrated by a plus (+) sign.

Block 146 of FIG. 3 represents new clusters grown around the centroids defined in block 144. The cluster growth sequences of FIGS. 5A and 5B may be applied here to grow the clusters around the appropriate centroids. One skilled in the art will appreciate that the grayscale tone level or color density will have an impact on the size and the amount of clusters grown in any particular region. Block 148 of FIG. 3 represents the addition of a dot that fills any identified voids. Block 148 corresponds to operations 134 and 136 of FIG. 2. Here, a dot or cluster centroid is added to a location next to a cluster where the largest void exists. Once again, Equation 1 may be used to identify the largest void, where the cost values are calculated for all the unfilled locations next to clusters and the minimum value identifies a void where a dot is added. As only a dot is added here, the dot is adjacent to a cluster in order to preclude an unstable situation for a printing device. That is, a printing device, such as a laser printer, image setter, photocopier, etc., is not configured to adequately print a single dot, therefore, the dot is added adjacent to a pre-existing cluster to avoid the unstable condition caused by a single isolated dot.

Figure 4:
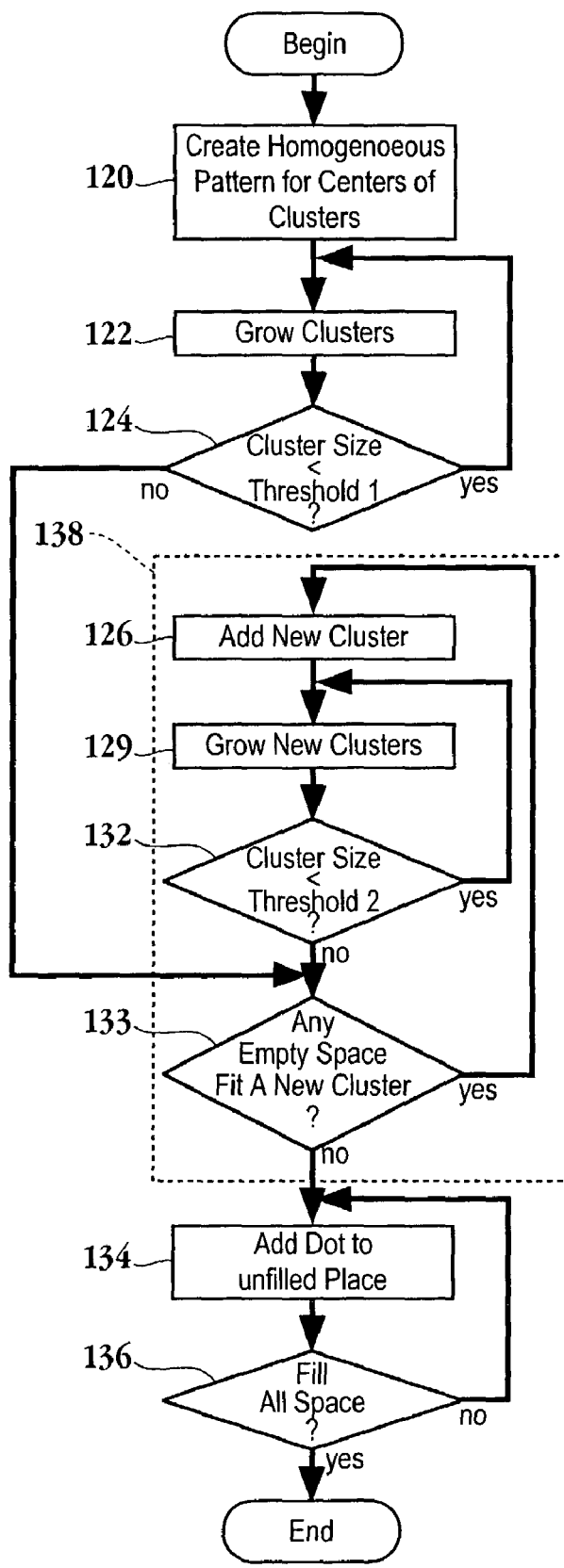
FIG. 4 is a flowchart diagram illustrating alternative method operations for generating a dispersed-cluster screen for printing image data from the method operations of FIG. 2.

FIG. 4 is a flowchart diagram illustrating alternative method operations for generating a dispersed-cluster screen for printing image data from the method operations of FIG. 2. It should be appreciated that the method operations within box 138 have been modified. In particular, method operations 126, 129, 132 and 133 are configured to add and grow one cluster at a time, as opposed to method operations 126, 128, 130 and 132 of FIG. 2, where the new cluster centroids are all added and then the clusters are grown from the centroids simultaneously. It should be appreciated that the method of FIG. 2 may be associated with some tone discontinuity or tone inversion during the transition, while the method of FIG. 4 may develop visual artifacts due to an imbalance of cluster distribution. However, one solution for the elimination of the visual artifacts is to develop an algorithm to generate homogenous pattern for clusters directly instead of the centroids.

Figure 6:
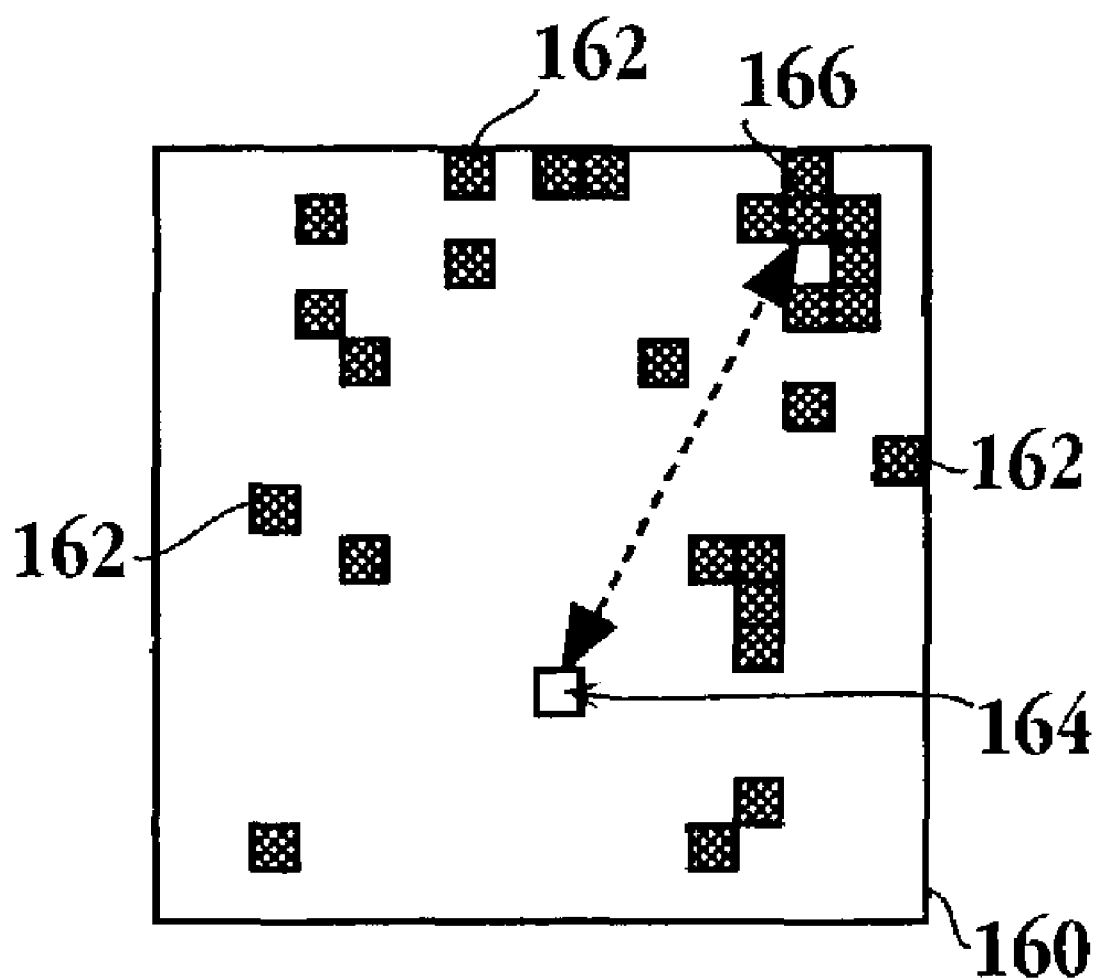
FIG. 6 is a schematic diagram illustrating the location of the largest void and the tightest centroid within a block in accordance with one embodiment of the invention.

FIG. 6 is a schematic diagram illustrating the location of the largest void and the tightest centroid within a block in accordance with one embodiment of the invention. Here, block 160 includes a number of centroids 162 defined therein. Through the application of Equation 1, a location representing largest void 164 is identified. Similarly, a location representing tightest centroid 166 is identified. Tightest centroid 166 is removed from its corresponding location and placed in largest void 164. Accordingly, the pattern of centroids is distributed in a homogenous manner through this scheme, thereby minimizing any visible patterns. It should be appreciated that FIG. 6 provides further details with reference to operation 120 of FIG. 4.

Figure 7:
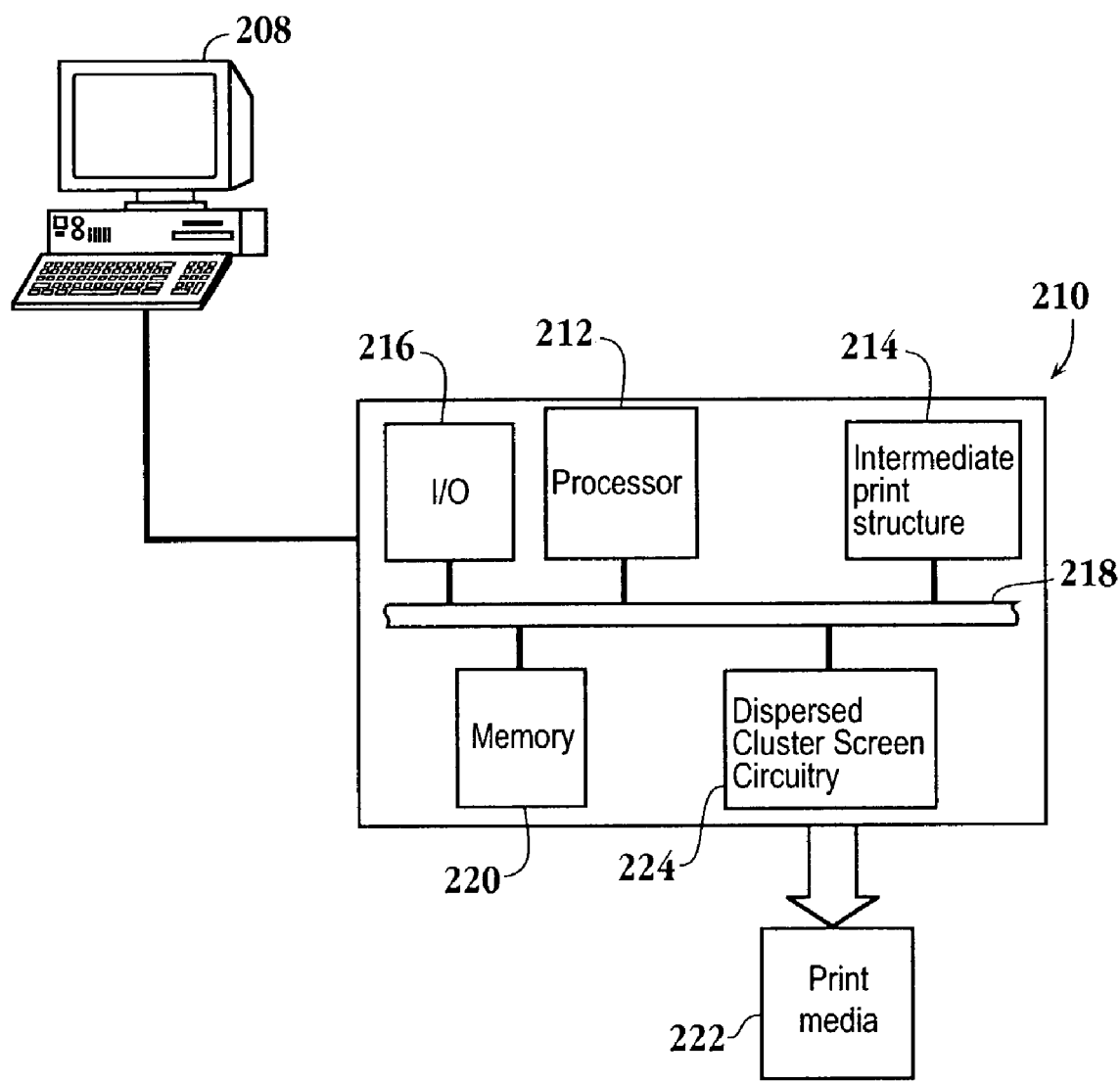
FIG. 7 is a simplified schematic diagram of a printer system in accordance with one embodiment of the invention.

FIG. 7 is a simplified schematic diagram of a printer system in accordance with one embodiment of the invention. Printer 210 includes processor 212, intermediate print structure 214, e.g., a drum for a laser printer, memory 220, dispersed cluster screen circuitry 224 and input/output (I/O) port 216, all of which are in communication through bus 218. Memory 220 may include read-only memory (ROM) and random access memory (RAM). In one embodiment, printer 210 may be any commercially available laser, image setter, photocopier, etc. The dispersed cluster screen is pre-computed and stored in printer's memory and may be a threshold matrix. Here, output is generated by comparing the input with the corresponding value in the screen. For example, dispersed cluster screen circuitry may be a comparator that compares the input with the corresponding value in the screen.

Printer 210 may be referred to as an image forming device that receives image data from a host processor via I/O 216. It should be appreciated that the functionality described with reference to FIGS. 2 and 4 may be provided to printer 210 through a print driver from host system 208 as an alternative to the firmware represented by dispersed cluster screen circuitry 224. Host system 208 is in communication with printer 210. Host system 208 may be general purpose computer in communication with the printer through a wire or wireless connection. The general purpose computer may be configured to download items from a distributed network such as the Internet. Thus, host system 208 may download the driver from a distributed network and transfer the downloaded driver to printing device 210. Alternatively, the driver may be provided on a computer readable media, i.e., compact disc, floppy disk, etc., which is then read by host system 208 and the data associated with the driver is subsequently transferred to printing device 210.

In summary, the embodiments described herein provide for a method and device for substantially eliminating unstable conditions for a printing device employing halftoning screen or stochastic screens for printing image data. A cluster of dots, i.e., centroids, are generated and distributed in a homogenous manner, thereby minimizing visible structure patterns. One skilled in the art will appreciate that while a modified void-and-cluster method is described above for generating the homogenous pattern and then determining additional locations for centroids, other methods may be used that provide the same functionality, i.e., minimization of visible structure patterns in the centroid distribution. The clusters are then grown to a predetermined size according to a cluster growth sequence. The predetermined size, or threshold size, represents a size that is both stable for an associated printing device and that also does not provide a visible pattern or structure when printed. Alternatively, the clusters may be grown to variable size clusters and variable shape clusters, however, the noise level tends to be greater where the size and shape of the clusters is variable. In one embodiment, a printing device employs the embodiments described herein.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for preparing image data for printing, comprising:
   generating a pattern of centroids;
   growing each of the centroids to at least a first threshold size cluster;
   determining whether a void sufficient for placing a new cluster exists;
   if a void sufficient for placing the new cluster exists, then the method includes,
      filling the void with a new centroid, and
      growing the new centroid to at least a second threshold size cluster;
   identifying a largest remaining void; and
   placing a dot alongside an existing cluster in a manner to reduce a size of the largest remaining void.

2. The method of claim 1, wherein the method operation of generating a pattern of centroids includes,
   identifying a tightest region;
   identifying a largest void; and
   transferring a dot from the tightest region to the largest void.

3. The method of claim 1, wherein the method operation of generating a pattern of centroids includes,
   applying a void-and-cluster scheme for distributing the centroids.

4. The method of claim 1, wherein a value associated with the first threshold size and a value associated with the second threshold size are the same.

5. The method of claim 1, wherein the method operation of growing each of the centroids to at least a first threshold size cluster includes,
defining a cluster growth sequence for expanding each of the centroids.

6. The method of claim 5, wherein the cluster growth sequence activates adjacent device pixels.

7. The method of claim 1, wherein the method operation of determining whether a void sufficient for placing a new cluster exists includes,
calculating a minimum of a filtered pattern according to a spatial cost function.

8. A method for generating a dispersed cluster screen defining a stable environment for printing an image, comprising:
generating a pattern of cluster centroids;
defining a cluster growth sequence;
growing a cluster around each cluster centroid according to the cluster growth sequence;
identifying a largest remaining void; and
placing a dot alongside an existing cluster proximate to the largest remaining void in a manner to reduce a size of the largest remaining void.

9. The method of claim 8, wherein the cluster growth sequence activates adjacent device pixels until a stable size of the cluster is obtained.

10. The method of claim 8, wherein the method operation of generating a pattern of centroids includes,
identifying a tightest region;
identifying a largest void; and
transferring a dot from the tightest region to the largest void.

11. The method of claim 8, further comprising:
defining a pattern of clusters from the grown clusters; and
applying the pattern of clusters to a print drum associated with a printing device.

12. The method of claim 11, wherein the pattern of clusters is free from a single isolated dot.

13. A computer readable medium having program instructions for generating a dispersed cluster screen, comprising:
program instructions for generating a cluster centroid;
program instructions for defining a cluster growth sequence;
program instructions for growing a cluster around each cluster centroid according to the cluster growth sequence;
program instructions for identifying a largest remaining void; and
program instructions for placing a dot alongside an existing cluster proximate to the largest remaining void in a manner to reduce a size of the largest remaining void.

14. The computer readable medium of claim 13, wherein the program instructions for the cluster growth sequence includes,
program instructions for activating adjacent device pixels.

15. The computer readable medium of claim 13, wherein the program instructions for generating a pattern of centroids includes,
program instructions for identifying a tightest region;
program instructions for identifying a largest void; and
program instructions for transferring a dot from the tightest region to the largest void.

16. The computer readable medium of claim 13, further comprising:
program instructions for defining a pattern of clusters from the grown clusters; and
program instructions for applying the pattern of clusters to a print drum associated with a printing device.

17. The computer readable medium of claim 13, wherein the program instructions for generating a cluster centroid includes,
program instructions for generating additional cluster centroids; and
program instructions for applying a void-and-cluster scheme for distributing the cluster centroid and the additional cluster centroids in a homogenous manner.

18. The computer readable medium of claim 17, wherein the program instructions for applying a void-and-cluster scheme for distributing the cluster centroid and the additional cluster centroids in a homogenous manner includes,
program instructions for identifying a tightest region;
program instructions for identifying a largest void; and
program instructions for transferring a dot from the tightest region to the largest void.

19. An image forming apparatus, comprising:
an input/output (I/O) port configured to communicate with external device;
a memory configured to store image data;
a processor configured to execute instructions for printing the image data;
dispersed cluster screen circuitry, the dispersed cluster screen circuitry configured to enable printing of the image data through generation of homogenously distributed clusters of dots, each of the clusters of dots grown from a centroid, wherein a size of each of the clusters of dots is stable for a printing structure of the image forming apparatus; and
a bus enabling communication between the I/O port, the memory, the dispersed cluster screen circuitry, and the processor.

20. The image forming apparatus of claim 19, further comprising:
an intermediate printing structure configured to transfer a pattern defined by the homogenously distributed clusters of dots to a print media.

21. The image forming apparatus of claim 20, wherein the intermediate printing structure is a print drum.

22. The image forming apparatus of claim 19, wherein the image forming apparatus is one of a laser printer, an image setter, and a photocopier.

23. The image forming apparatus of claim 19, wherein the dispersed cluster screen circuitry includes,
circuitry configured to identify a tightest region;
circuitry configured to identify a largest void; and
circuitry configured to transfer a dot from the tightest region to the largest void.

* * * * *